F. McLAUGHLIN.
LIQUID DISPENSING DEVICE.
APPLICATION FILED APR. 22, 1918.
1,300,183.
Patented Apr. 8, 1919.
2 SHEETS—SHEET 1.
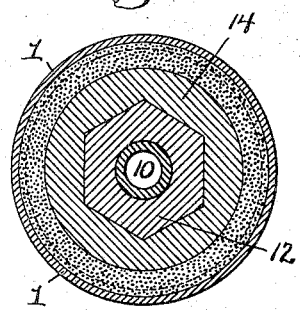
Fig. 3.
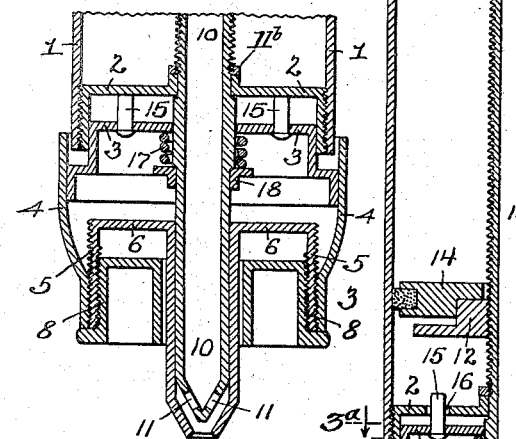
Fig. 2.
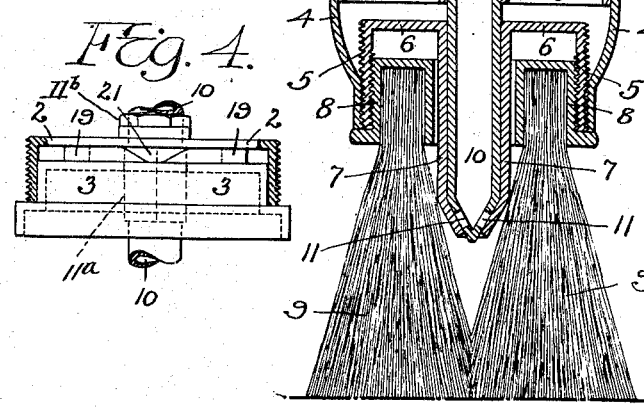
Fig. 4.
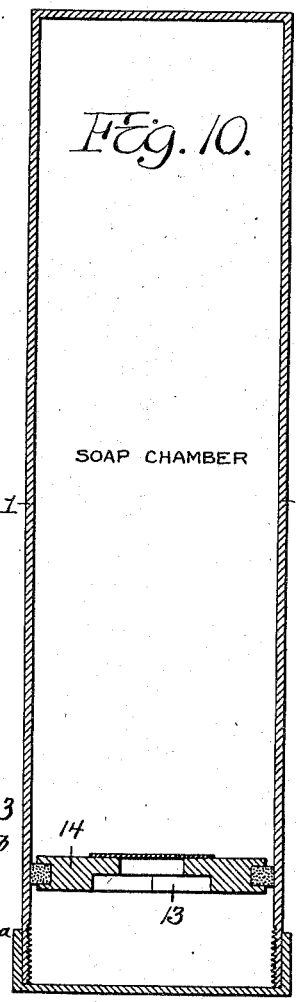
Fig. 1.
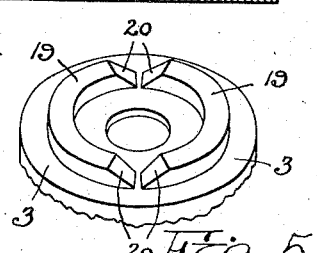
Fig. 10.
Fig. 5.
INVENTOR
FRANK McLAUGHLIN
BY HIS ATTORNEY
Harry Smith F. McLAUGHLIN.
LIQUID DISPENSING DEVICE.
APPLICATION FILED APR. 22, 1918.
1,300,183.
Patented Apr. 8, 1919.
2 SHEETS—SHEET 2.
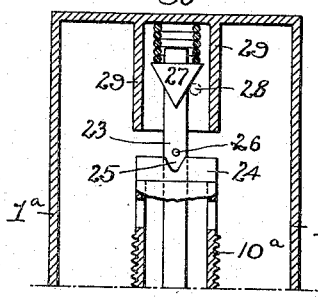
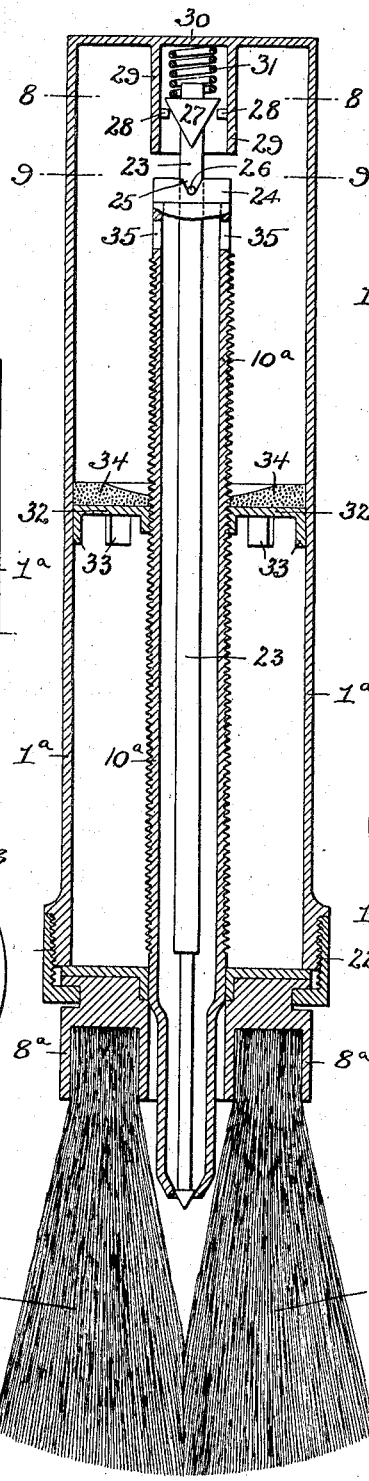
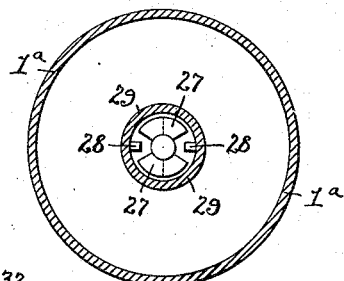
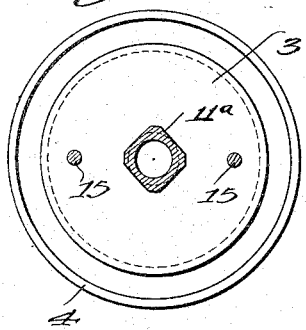
INVENTOR
FRANK McLAUGHLIN
BY HIS ATTORNEY
Harry Dwitt

UNITED STATES PATENT OFFICE.

FRANK McLAUGHLIN, OF PHILADELPHIA, PENNSYLVANIA, ASSIGNOR TO DE LUXE BRUSH COMPANY, OF PHILADELPHIA, PENNSYLVANIA, A CORPORATION OF DELAWARE.

LIQUID-DISPENSING DEVICE.

1,300,183.     Specification of Letters Patent.     Patented Apr. 8, 1919.

Application filed April 22, 1918. Serial No. 230,090.

*To all whom it may concern:*

Be it known that I, FRANK McLAUGHLIN, a citizen of the United States, residing in Philadelphia, Pennsylvania, have invented certain Improvements in Liquid-Dispensing Devices, of which the following is a specification.

My invention relates to that type of dispensing vessels for plastic or fluid material which provide for the intermittent discharge of the material and for maintaining said material constantly under sufficient pressure to cause such discharge.

In the accompanying drawings

Figure 1 is a vertical sectional view of a dispensing vessel constructed in accordance with my invention;

Fig. 2 is a similar view of the forward end of the same with some of the parts in a different position from that represented in Fig. 1;

Fig. 3 is a horizontal section on the line 3—3, Fig. 1;

Fig. 3$^a$ is a view in horizontal transverse section taken on the line 3$^a$—3$^a$ of Fig. 1, the handle and cap attached thereto being removed.

Fig. 4 is a view partly in section and partly in elevation illustrating a modification of one of the features of my invention;

Fig. 5 is a detached perspective view of one of the elements of the structure shown in Fig. 4;

Fig. 6 is a view similar to Fig. 1 but illustrating certain other means in accordance with my invention for effecting discharge of the material at intervals;

Fig. 7 is a view illustrating certain parts of Fig. 6 in a different position from that there shown;

Fig. 8 is a horizontal section on the line 8—8, Fig. 6;

Fig. 9 is a horizontal section on the line 9—9, Fig. 6, and

Fig. 10 is a view of a cartridge containing plastic or fluid material intended to be discharged by a device in accordance with my invention.

In the drawing I have shown my invention as applied to a shaving brush for the purpose of feeding supplies of plastic soap thereto at intervals, but it should be understood that my invention is not limited to such use but can be applied to devices generally for the dispensing of plastic or fluid material, In the drawings, 1 represents a casing or reservoir containing the material to be dispensed, such reservoir, which in the device shown in Fig. 1, constitutes the handle of the brush, being closed at its rear end and also having its front end closed by a cap 2 which has an externally threaded flange for engagement with the internally threaded forward end of the reservoir 1. The flanged cap 2 also receives a plug 3 flanged at its forward end and having said flange secured to a ring 4, the forward end of the latter being internally threaded for the reception of the external thread on a flange 5, projecting forwardly from a disk 6, which carries a central tube 7 having a conical forward end constituting a valve seat.

The flange 5 is internally threaded for the reception of the externally threaded head 8 of the brush 9, and to the central tube 7 is fitted the forward portion of a valve tube 10, which has a conical forward end adapted to the valve seat at the forward end of the tube 7 and having ports 11 to permit of the escape of material from the interior to the exterior of the same and thence through the central opening of the valve seat into the interior of the brush, as shown in Fig. 2.

The hollow valve tube 10 is provided with a squared portion 11$^a$ which extends through a correspondingly shaped opening in the top of the plug 3. The squared portion 11$^a$ fits the opening through the said plug loosely so as to permit longitudinal movement of the said tube through said opening.

The upper end of the said squared portion terminates in a shoulder which fits against the under side of the cap 2 through the central opening of which the tube 10 extends. The tube fits loosely in the opening through the cap 2 so that the said cap and tube are relatively rotatable. Relative longitudinal movement of the cap 2 and the tube 10 is prevented by a nut 11$^b$ which fits against the upper edge of the hub of the said cap. It is necessary that the connection between the cap 2 and the tube 10 shall be such as to permit relative rotation between the two parts in order that there may be relative rotation between the said tube and the handle or reservoir 1 which is secured to and is adapted to rotate with the cap 2.

The portion of the valve tube which is within the reservoir 1 is externally threaded for engagement with a nut 12 which has a hexagonal or other polygonal shape for engagement with a similarly shaped recess 13 in a suitably packed plunger 14 which fits snugly to the inner wall of the reservoir 1, as shown in Fig. 1.

The plug 3 has one or more inwardly projecting pins 15 and the cap 2 has a like number of openings 16 for the reception of said pins, the number of pins and openings employed being dependent upon the amount of material which is to constitute each of the intermittent discharges from the reservoir.

Supposing that the parts are in the position shown in Fig. 1, the ring 4 is held in one hand and the reservoir 1 is withdrawn with the other hand until the cap 2 is free from engagement with the pins 15, this movement also withdrawing the valve tube 10 so as to permit escape of the material through the ports 11 and thence through the central port of the valve seat, as shown in Fig. 2. As soon as the cap 2 is free from the control of the pins 15 the reservoir 1 can be rotated about its axis, the plunger 14 rotating with it, by reason of the frictional hold of said plunger upon the inner walls of the reservoir, thus imparting like rotation to the nut 12 and causing the same to rise on the threaded portion of the valve tube, thereby causing the plunger 14 to rise with it and impart pressure to the soap above it, a quantity of this soap passing over the inner end of the valve tube, and thence forwardly to the discharge ports 11 at the forward end of the tube.

As soon as the rotating movement of the receptacle brings the openings 16 in the cap 2 again into line with the pins 15 the valve tube 10 is moved forwardly by the action of a spring 17 interposed between the plug 3 and a collar 18 on said valve tube, this forward movement serving to close the ports 11 against the valve seat and thus cut off any further discharge of soap until the valve tube has been again withdrawn.

With a given pitch to the thread on the valve tube the amount of soap delivered at each discharge is dependent upon the number of pins 15 and openings 16 employed, thus, if there is only one pin on the plug 3 and one opening in the head 2 a full turn can be imparted to the reservoir 1, head 2 and nut 12, diametrically opposite pins and similarly disposed openings providing for a half turn of the parts, three equi-distantly disposed pins and openings for one-third of a rotation, and so on.

Instead of providing for a direct withdrawal of the receptacle 1 previous to this rotating movement I may combine these movements by adopting the construction shown in Figs. 4 and 5, in which the plug 3 has, mounted upon the back of the same, a ring 19 with diametrically opposite recesses 20 having oppositely inclined faces, these recesses receiving cam blocks 21 on the forward side of the cap 2, so that during the first portion of the rotation of said cap the cam blocks 21 will rise from the recesses 20 and thus effect corresponding retraction of the valve tube 10, said cam blocks riding on the inner face of the ring 19 during the continued rotation of the cap 2 until they again come into line with and enter the recesses 20 under the action of the spring 17.

In the construction shown in Figs. 6 to 10, the forward end of the reservoir 1$^a$ has a ring 22 which engages an external groove in the brush head 8$^a$ so as to permit turning movement of said reservoir in respect to said brush head. The valve tube 10$^a$, which has rigid and fixed connection with the head 8$^a$ has a conical seat at its forward end and contains a valve rod 23 whose forward end closes against said seat to cut off the escape of soap from the valve tube into the brush. At its inner end the valve tube 10$^a$ has a ring 24 with oppositely disposed notches 25 therein for the reception of pins 26 projecting from opposite sides of the valve rod 23. On said valve rod are also oppositely projecting cam blocks 27 upon which act pins 28 projecting inwardly from a tube 29 extending forwardly from the center of the rear head 30 of the reservoir, said tube also containing a coiled spring 31 which acts upon the cam blocks 27 so as to tend to impart constant forward movement to the valve rod 23.

The nut which engages the externally threaded valve tube 10$^a$ constitutes part of a plunger 32 which has elastic fingers 33 bearing upon the inner wall of the reservoir 1$^a$, a ring 34, which bears upon the back of the plunger 32, being also in contact with said inner wall.

When, therefore, the reservoir is rotated, it will carry the plunger 32 with it and will cause said plunger and its ring 34 to rise on the valve tube and thus impart pressure to the body of soap in advance of the same, a portion of the soap passing to the interior of the valve tube through openings 35 at the rear end of the same and thence through the valved opening at the forward end of the tube into the brush, the withdrawal, for this purpose, of the valve at the forward end of the rod 23 being effected by the action of the pins 28 on the cam blocks 27, which, so long as the pins 26 are in engagement with the notches 25, cannot turn, hence the cam blocks 27 will be retracted until the pins 26 are withdrawn from the slots 25, as shown in Fig. 7, whereupon the valve rod can turn with the reservoir until the pins 26 are again in position to enter the notches 25, at which time the valve rod will be thrust forward by the action of the spring 31.

It will be evident that instead of rotating the handle of the brush in respect to the head of the same the handle may be held stationary and the head rotated with the same effect.

I claim:

1. The combination of the reservoir and head, one rotatable in respect to the other, a valve seat, a valve thereon, means for closing said valve against said seat, and means for normally arresting the rotation of the rotatable part until said valve has been opened by longitudinal movement.

2. The combination of the reservoir and head, one rotatable in respect to the other, a valve member rotatable with one of said parts and also movable longitudinally in respect thereto, cam mechanism for causing such longitudinal movement in one direction, and a spring for causing such longitudinal movement in the opposite direction.

3. In a device for dispensing plastic or liquid material, the combination of the reservoir and head members, one rotatable with respect to the other, a tube carried by one of said members and having a valve seat and an opening at its forward end, a valve rotatable with said member and coöperating with said valve seat, said valve being movable longitudinally with respect to said member, said valve having connection with a part which extends into said reservoir, and a plunger in engagement with said part, said plunger and part being relatively rotatable.

4. In a device for dispensing plastic or liquid material, the combination of the reservoir and head, one rotatable with respect to the other, a tube carried by one of said parts and having a valve seat and an opening at its forward end, a discharge tube rotatable with said part and being movable longitudinally with respect thereto, the forward end portion of said discharge tube extending into the first named tube and being provided with a valve portion which coöperates with said valve seat, the rear end portion of said tube extending into the said reservoir, and a plunger in engagement with the said rear end portion of the discharge tube, said plunger and said discharge tube being adapted to have relative longitudinal movement with respect to each other.

5. In a device for dispensing liquid, semi-liquid and plastic material, the combination of a receptacle for holding the material to be discharged, a discharge tube extending from the interior of said receptacle and projecting beyond the forward end thereof, the forward end of said discharge tube terminating in a valve portion, a tube into which said forwardly projecting part of said discharge tube extends, said second named tube having an opening at its forward end which is adapted to be opened and closed by said valve portion, and means for causing relative longitudinal movement between the first and second named tubes to open and close said opening.

6. In a device for dispensing liquid, semi-liquid and plastic material, the combination of a receptacle for holding the material to be discharged, a discharge tube extending from near the rear end of said receptacle and projecting beyond the forward end thereof and terminating in a valve portion, the rear end of said discharge tube having an opening therein, a relatively stationary tube into which the projecting part of said discharge tube extends, said relatively stationary tube having an opening in its forward end through which the said material escapes after leaving said discharge tube, and means for reciprocating said discharge tube relative to said second named tube to open and close said opening.

7. In a device for dispensing liquid, semi-liquid and plastic material, the combination of a receptacle for holding the material to be discharged, a discharge tube extending from the interior of said receptacle and projecting beyond the forward end thereof and terminating in a valve portion, a relatively stationary tube into which the projecting part of said discharge tube extends, said relatively stationary tube having an opening in its forward end through which the said material escapes after leaving said discharge tube, means for causing movement of one of said tubes relative to the other, and means for exerting pressure upon said material in the receptacle to cause the discharge of the same.

8. In a device for dispensing liquid, semi-liquid and plastic material, the combination of a receptacle for holding said material, a discharge tube leading from the interior of said receptacle and projecting beyond the forward end thereof and having a discharge opening at its forward end, a tube into which the forward end of said discharge tube projects, the said second named tube having a part which is adapted to close said discharge opening, means for causing relative longitudinal movement between the said tubes to effect opening and closing of said discharge opening, and means for causing the discharge of the said liquid, semi-liquid or plastic material from said receptacle through said discharge tube and the forward end of said second named tube.

In testimony whereof I have signed my name to this specification.

FRANK McLAUGHLIN.